US011090143B2

(12) United States Patent
Luu (10) Patent No.: US 11,090,143 B2
(45) Date of Patent: Aug. 17, 2021

(54) APPARATUS AND METHOD FOR PURGING A DENTAL AIR/WATER SYRINGE INCLUDING A BUTTON HOLD-DOWN DEVICE AND FLUID COLLECTION CONTAINER

(71) Applicant: Anton T. H. Luu, Valleyview (CA)

(72) Inventor: Anton T. H. Luu, Valleyview (CA)

( * ) Notice: Subject to any disclaimer, the term of this patent is extended or adjusted under 35 U.S.C. 154(b) by 184 days.

(21) Appl. No.: 16/394,501

(22) Filed: Apr. 25, 2019

(65) Prior Publication Data

US 2019/0350686 A1 Nov. 21, 2019

(30) Foreign Application Priority Data

May 17, 2018 (CA) .................................. CA 3005204

(51) Int. Cl.
*A61C 17/02* (2006.01)
*A61C 1/00* (2006.01)
*A61C 19/00* (2006.01)
*A61C 17/022* (2006.01)

(52) U.S. Cl.
CPC ........ *A61C 17/0202* (2013.01); *A61C 1/0061* (2013.01); *A61C 17/022* (2013.01); *A61C 19/002* (2013.01)

(58) Field of Classification Search
CPC . A61C 1/0061; A61C 1/0076; A61C 17/0202; A61C 17/022; A61C 17/02–0205; A61C 17/0208; A61C 17/0217; A61C 17/024; A61C 17/032; A61C 17/028; A61C 17/00; A61C 17/06; A61C 19/002
See application file for complete search history.

(56) References Cited

U.S. PATENT DOCUMENTS

| 4,902,225 A * | 2/1990 | Lohn ..................... A61C 1/088 433/29 |
| 4,975,054 A * | 12/1990 | Esrock ............... A61C 17/0217 433/126 |
| 5,658,144 A * | 8/1997 | Tinder ................... A61C 17/02 433/80 |
| 6,382,970 B1 * | 5/2002 | Foster ................. A61C 17/024 433/80 |
| 2013/0089832 A1 * | 4/2013 | Lee ..................... A61C 17/0202 433/82 |
| 2020/0037867 A1 * | 2/2020 | Plant ..................... A61B 1/253 |

* cited by examiner

*Primary Examiner* — Edward Moran
(74) *Attorney, Agent, or Firm* — Christopher J Dynowski; Ryan W Dupuis; Ade & Company Inc.

(57) ABSTRACT

An apparatus and method for purging a dental air/water syringe comprises at least one of a button hold-down device for holding down at least one button of the syringe for discharging fluid therefrom and a collection container for collecting the discharged fluid. The button hold-down device includes axially spaced contact surfaces for contacting a syringe body and the button so that the device is supported mounted on the syringe body in a working position. The collection container features an interior perforated false bottom wall under which is formed a collection space where the discharged fluid collects, and a drain is communicated with the collection space for removing the collected fluid therefrom. The drain can be connected to a saliva ejector for removal of the fluid by suction.

10 Claims, 6 Drawing Sheets

APPARATUS AND METHOD FOR PURGING A DENTAL AIR/WATER SYRINGE INCLUDING A BUTTON HOLD-DOWN DEVICE AND FLUID COLLECTION CONTAINER

This applications claims the benefit of Canadian patent application serial no. 3,005,204 filed May 17, 2018.

FIELD OF THE INVENTION

The present invention relates generally to arrangements and methods for purging a dental air/water syringe otherwise known as a tri-way syringe, and more particularly to such arrangements and methods which comprise a hold-down device for depressing a button of the dental air/water syringe and a container for collecting water discharged during purging of the syringe.

BACKGROUND

It is known in the practice of dentistry and orthodontia to employ syringes to apply air and/or water to the mouth of a patient during treatment. Known dental syringes often employ air and water so that an operator of such a syringe may use compressed air or a stream of water by depressing air and water buttons of the syringe respectively, or a spray of water by depressing both buttons simultaneously.

To lessen the risk of patient exposure to water-borne bacteria, it is recommended that dental syringe water lines are purged at least two minutes at the beginning of each day of use. Additionally, it is recommended that the lines are purged for about 20 to 30 seconds between patients.

U.S. Pat. No. 6,382,970 to Foster shows a purge hold-down device for a dental air/water syringe. The purge hold-down device comprises a hold-down portion which acts to depress at least one of the buttons of the syringe, and a bracing portion which Foster teaches acts to maintain the hold-down portion against the depressed syringe button. The Foster arrangement comprises a one-piece construction forming a closed loop defining a plane. The loop can be slipped over the dental syringe for mounting in a prescribed hold-down position on the syringe.

SUMMARY OF THE INVENTION

According to an aspect of the invention there is provided a button hold-down device for a dental syringe having a syringe body adapted for supporting a syringe tip and at least one button carried on the syringe body for discharging a fluid out of the syringe body, comprising:

a device body defining an opening for receiving the syringe body therein in a working position of the device body;

a syringe body contact surface supported on the device body at a location along a periphery of the opening for engaging the syringe body of the dental syringe to support the button hold-down device in the working position; and a button contact surface supported on the device body at an axially spaced location from the syringe body contact surface relative to an axis of the opening which is oriented substantially parallel to a direction in which the opening opens for engaging said at least one button of the dental syringe in the working position.

The arrangement of the present invention is more stable than that of Foster as the contact surfaces for bracing the hold-down device against the syringe and for depressing the button of the syringe are spaced in the axial direction of the device body, as they are spaced on the syringe itself. In contrast, the Foster arrangement is prone to being displaced from its prescribed hold-down position because in a conventional syringe the top surface of the button and the surface on the syringe body against which the Foster hold-down device is braced are not parallel to one another, and yet the planar loop design of Foster attempts to align these two surfaces in a common plane which in practice does not lead to a stable configuration.

According to another aspect of the invention there is provided a container for use in purging of a dental syringe comprising:

a container body having an imperforate bottom wall and an upstanding peripheral wall defining a receptacle;

a perforated false bottom wall supported at a spaced location above the imperforate bottom wall of the container body to form a collection space therebetween for collecting purged fluid discharged by the dental syringe;

and a drain communicated with the collection space for removing the purged fluid from the container body.

This arrangement provides an upper perforated floor of the container defining an initial contact surface which the discharged fluid hits or against which the dental syringe can be rested and left while discharging fluid. The discharged fluid flows by gravity past this false-bottom wall and collects there beneath such that no discharged fluid remains above a height of the false-bottom wall so as to reduce splashing as more fluid continues to be discharged from the syringe.

According to yet another aspect of the invention there is provided a method for purging a dental syringe comprising:

discharging fluid from the dental syringe into a container;

removing the purged fluid from the container by suction using a saliva extractor.

This arrangement employs a tool already available in a dental office which is the saliva extractor to remove discharged fluid emitted from the syringe, as opposed to letting the fluid collect in the container where upon reaching a certain level the already discharged fluid causes splashing when contacted by freshly emitted fluid discharged by the syringe. Thus, this arrangement can be left unattended for an extended period of time without concern of the container overflowing or substantial splashing of fluid causing a mess.

In one arrangement, the button hold-down device further includes a button contact member, which carries the button contact surface, projecting transversely from the device body forming a closed annulus relative to a plane defined by the annulus.

In one arrangement, the button contact member is connected to the device body at a transversely central location and projects therefrom towards one side of the device body.

In one arrangement, a portion of the button contact member defining the button contact surface is oriented at an inclined angle to the axis of the opening such that a distal end of the button contact member with respect to the device body is spaced further from the axis than a proximal end of the button contact member.

In one arrangement, there is provided a hooked portion coupled to the device body for wrapping about said at least one button from the top surface thereof towards an underside of said at least one button, the hooked portion comprising a neck portion projecting in a generally radially inward direction relative to the opening defined by the device body and an end portion which projects from the neck portion to a terminus spaced axially of the neck portion to form a hooked end.

In one arrangement, the end portion of the hooked portion is bifurcated to extend from a central location of said at least one button to either side of a respective stem of said at least one button.

This hooked portion may act to further brace the hold-down device mounted on the syringe body in the working position.

In one arrangement, the drain of the container forms a tubular conduit with a lower end of the tubular conduit communicated with the collection space and an upper end of the tubular conduit located externally of the container body at a height spaced above the lower end.

In one arrangement, an external end of the drain is connectable to a saliva extractor.

Preferably, the container further includes an annular splash guard mounted to the container body at a height above the false bottom wall, the splash guard extending inwardly from the upstanding peripheral wall to an annular inner edge of the splash guard which is located inwardly of an interior perimeter of the false bottom wall.

The container may also include a plurality of projections projecting from an inner surface of the container body disposed at spaced locations thereon for reducing backsplash of the purged fluid contacting said inner surface.

For the method there may be provided a hold-down device installed on the dental syringe for maintaining at least one button of the dental syringe depressed for discharging the fluid from the dental syringe into the container.

When the container employed in the method for purging the dental syringe comprises an imperforate bottom wall, an upstanding peripheral wall, and a perforated false bottom wall supported at a spaced location above the imperforate bottom wall to form a collection space therebetween for collecting the fluid discharged by the dental syringe, it is preferred that the saliva extractor is operatively communicated with the collection space for removing the fluid collected therein.

In one arrangement there is provided a tubular conduit with a lower end in communication with the collection space and an upper end located externally of the container at a height spaced above the lower end and connected to the saliva extractor.

BRIEF DESCRIPTION OF THE DRAWINGS

The invention will now be described in conjunction with the accompanying drawings in which.

In the drawings like characters of reference indicate corresponding parts in the different figures.

DETAILED DESCRIPTION

The accompanying figures show an apparatus and method for purging a dental air/water syringe 1, also termed in industry as a tri-way syringe, which comprises a button hold-down device 10 and a collection container 12.

As shown in FIGS. 1-4, a conventional tri-way dental syringe 1 comprises a syringe body 2 which forms a housing for a pair of valves (not shown) each operated by a respective depressible button 4, 5. Each internal line along which the respective button-operated valve is operatively coupled is communicated at an input end with a fluid line (not shown) carrying air or water to the syringe 1. Both lines converge at a single output or discharge 7 at a head of the syringe body 2 which is adapted for supporting a replaceable syringe tip (not shown). The syringe 1 can be operated to discharge air only, water only, or a combination thereof to form a mist when discharged simultaneously, by depressing only one of the buttons 4, 5 which located on the topside of the head, or depressing both buttons simultaneously.

It is recommended practice to purge the water line (not shown) to which the syringe 1 is connected so as to flush out any potential contaminants in the line, such as microbes and other free-floating organisms known in industry as "biofilm". Traditionally, this purging operation is done manually with a human user holding down the button of the syringe to discharge fluid therefrom into a sink or a conventional bucket which following the purging operation is emptied.

Figure 1:
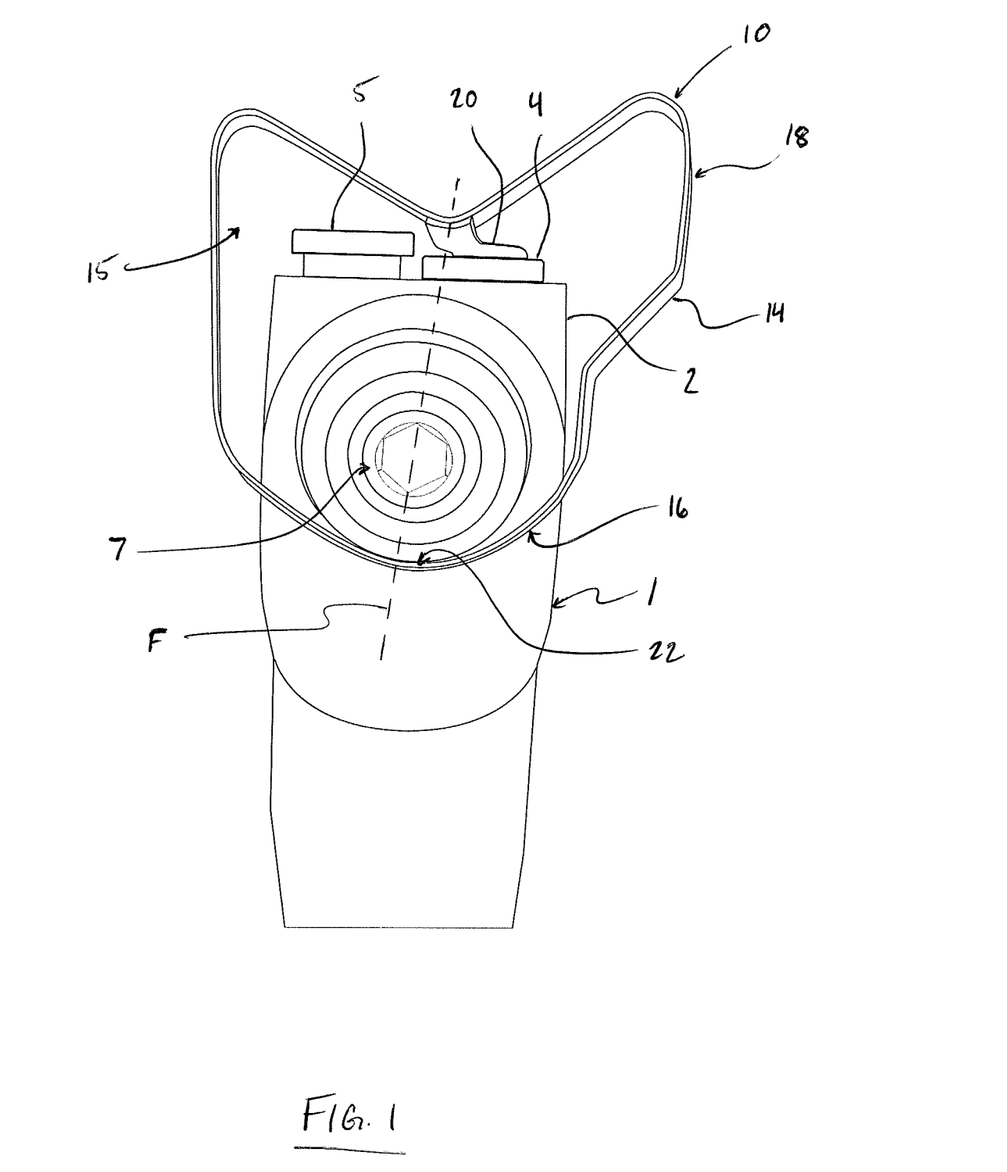
FIG. 1 is a front elevational view of an arrangement of button hold-down device according to the present invention mounted on a conventional dental air/water syringe.
Figure 2:
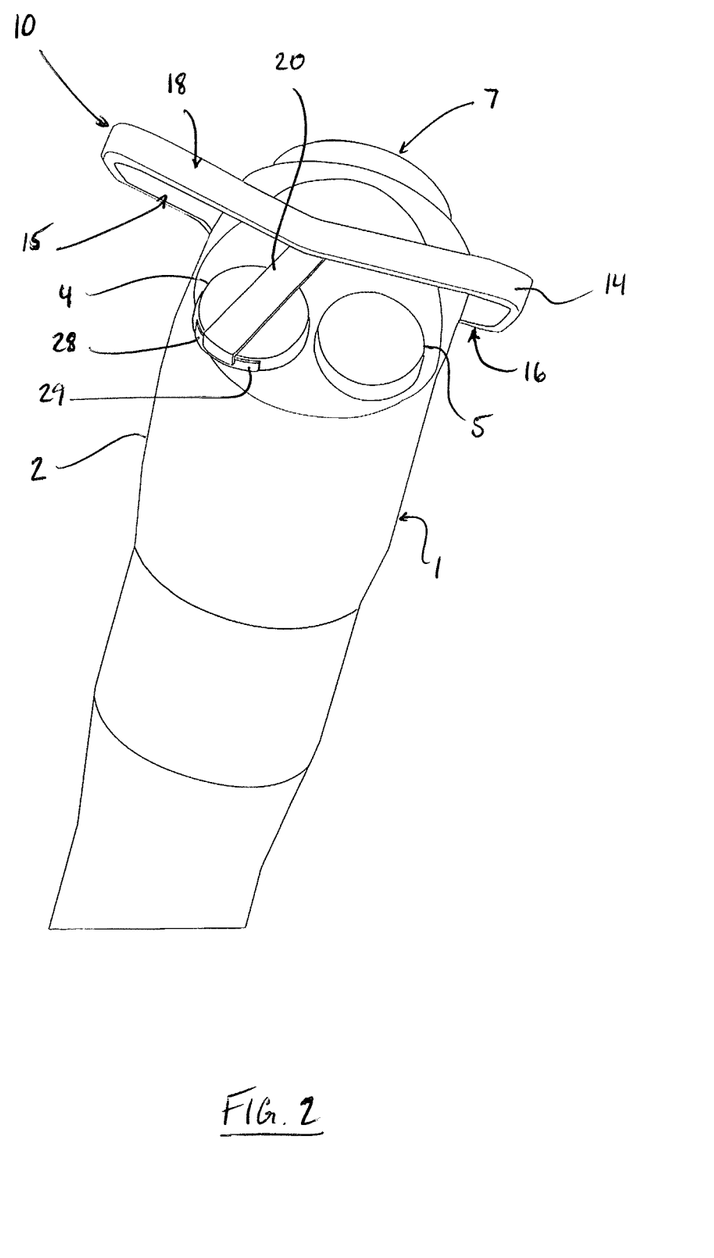
FIG. 2 is a rear perspective view of the arrangement of button hold-down device of FIG. 1.

The button hold-down device 10 comprises a device body 14 in the form of a closed loop or annulus which defines a thru-opening 15 for receiving the head of the syringe body in a working position of the device body 14 as shown for example in FIGS. 1 and 2. The hold-down device 10 comprises a bracing portion 16 adapted for supporting the device 10 on the syringe body 2 in the working position by contact with a surface of the syringe body 2 at an underside of the head. Opposite the bracing portion 16 is a hold-down portion 18 which is shaped to resiliently bias a button contact member 20 for holding down at least one button 4 or 5 of the syringe 1, so that in the working position of the device 10 the hold-down device alone maintains the button 4 in a depressed condition to discharge fluid without any human user input.

The device body 14 is formed from a strip of stainless steel metal formed into the closed loop. The endless loop is planar so that the whole of the device body 14 effectively lies in a plane. The bracing portion 16 defines on its inner surface, which delimits a portion of the thru-opening 15, a syringe body contact surface 22 which is parallel to an axis A of the thru-opening 15 so that the syringe body contact surface 22 is in abutting contact with the discharge end 7 of the syringe as well as with the underside surface of the syringe head in the working position. The opening axis A is oriented parallel to a direction in which the thru-opening 15 opens, which is normal to the plane defined by the loop.

The button contact member 20 is located at an angularly spaced position from the syringe body contact surface 22 so as to be disposed in angularly opposed relation thereto, the syringe body contact surface 22 on an underside of the syringe body 2 and the button contact member 20 on a topside thereof. In the working position of the device 10 as shown more clearly in FIG. 3, the loop-forming device body 14 is located forwardly of the buttons 4, 5 and thus the button contact member 20 projects therefrom in a rearward axial direction so as to bridge a distance to the buttons 4, 5 from the mounted device body 14. In the illustrated embodiment of the hold-down device 10, the button contact member 20 projects transversely at an inclined angle to the plane defined by the annulus of the device body 14 from a transversely central location of the hold-down portion 18 of device body 14 and towards one side of the device body 14 nearer which the button 4 to be depressed is located. As more clearly shown in FIG. 3, the attachment location of the button contact member 20 relative to the hold-down portion 18 is not necessarily aligned with a transverse center of the syringe body 2 when in the working position, and in the illustrated embodiment the attachment location is offset from the transverse center of the syringe body.

Figure 3:
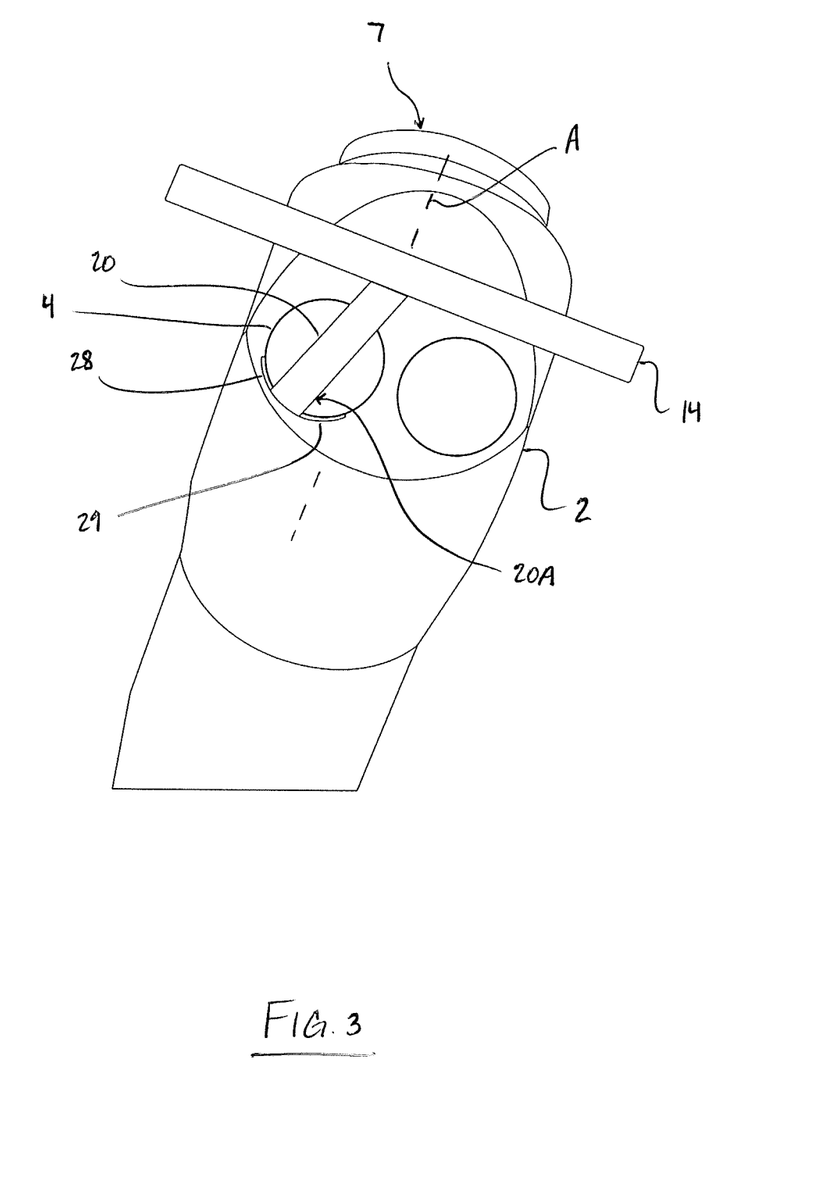
FIG. 3 is a top plan view of the arrangement of button hold-down device of FIG. 1.

The button contact member 20 defines a button contact surface 24 on an underside of the member 20, so as to carry same, for engaging one of the buttons 4 of the syringe 1 in the working position. The button contact surface 24 is thereby supported on the device body 14 via the button contact member 20 at a location which is axially spaced from the syringe body contact surface 22. In the illustrated embodiment, the button contact member 20 is a thin elongated strip which is sufficiently wide for contacting only one of the buttons; however, in other embodiments which are not shown, a distal end 20A of the button contact member which is alignable with the buttons 4, 5 in the working position with respect to a radial direction may be widened so that both buttons 4 and 5 are engaged and subsequently depressed thereby.

Thus the syringe body contact surface 22 and the button contact surface 24 are both angularly and axially spaced from one another, so that in the working position of the device 10 they cooperate to contact the syringe 1 in opposition to one another in a manner sufficient to support the device 10 in the working position. As more clearly shown in FIG. 1, the forces exerted by the button hold-down device 10 on the syringe body 2 when mounted thereon in the working position are localized at angularly opposite positions on the device body 14 (locations defined by the syringe body contact surface 22 and the attachment location of the button contact member 20 at the device body) that lie along a plane F which passes through a center of the syringe discharge end 7. Thus the device 10 remains stably mounted on the syringe body 2 in the working position thereof. Upon mounting onto the syringe body 2, the button contact member 20 is resiliently biased against the top surface of the button 4 which itself is resiliently biased to a non-depressed neutral condition, whereby the corresponding valve is closed so that no fluid flows. Thus by the action of mounting the device 10 on the syringe, disposing the device 10 in the working position is alone sufficient to cause the button 4 to remain in the depressed condition.

At the distal end 20A of the button contact member 20 there is provided a hooked retaining portion 25 for wrapping from a top surface towards an underside of the button 4 engaged by the button contact member 20 to further brace the device 10 when mounted on the syringe body 2. The hooked portion 25 comprises a curving neck portion 26A which extends out of the plane in which the elongated button contact member 20 is located, and generally in a radially inward direction relative to the thru-opening 15 as if towards a centrally placed axis A thereof. The hooked retaining portion 25 also includes a bifurcated end portion 26B projecting from the neck portion 26A to a terminus collectively defined by free ends of two prongs 28, 29 that are formed by the end portion. The free ends of the prongs 28, 29 are spaced both in the generally radially inward direction and axially forwardly from the distal end 20A of the button contact member 20 so as to form a hooked end on the button contact member 20. As shown more clearly in FIG. 4, the prongs 28, 29 of the end portion extend on either side from a central location of the hooked portion defined by the neck portion 26A so that the end portion 26B reaches to either side of the button 4.

Figure 4:
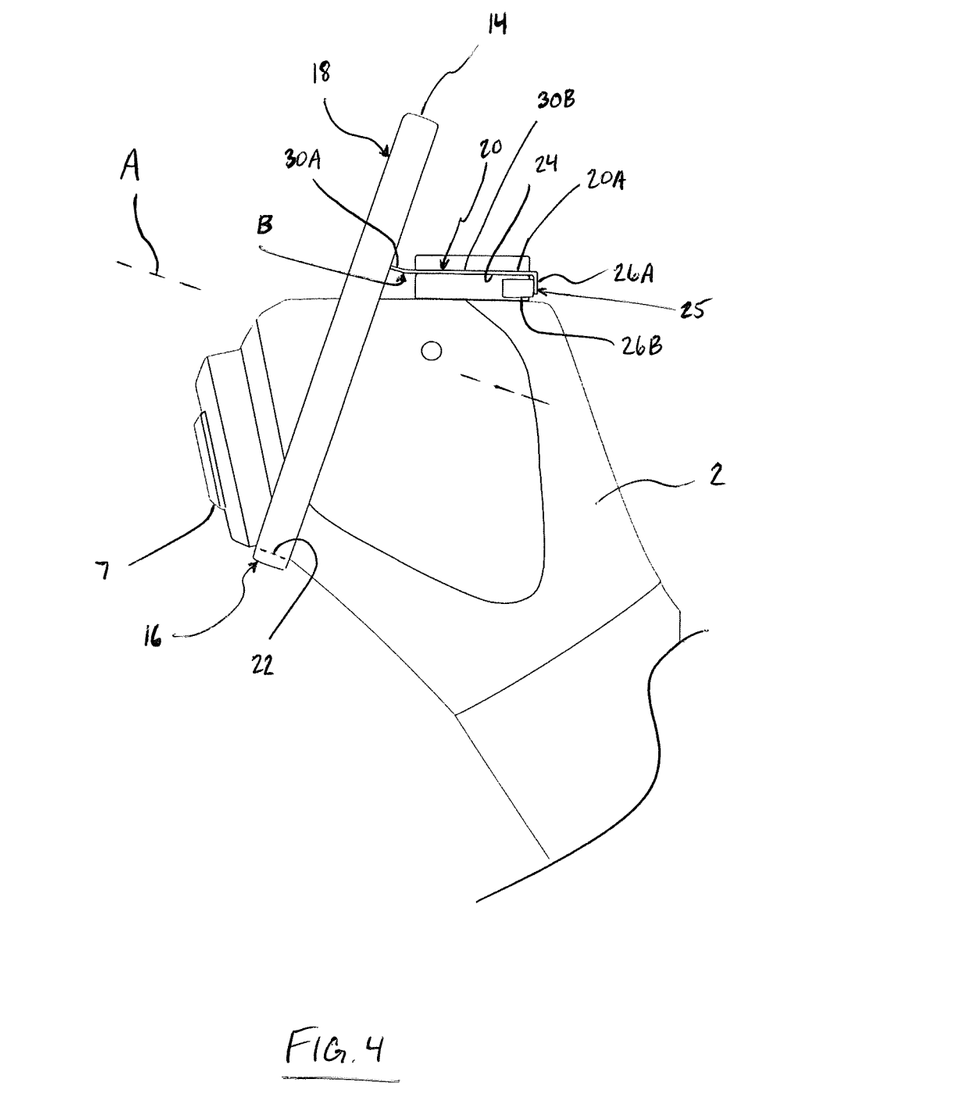
FIG. 4 is a side elevational view of the arrangement of button hold-down device of FIG. 1.

As shown in FIG. 4, in the illustrated embodiment the button contact member 20 is bent at an intermediary point B spaced from the device body 14 so as to follow a piecewise linear path, where a first adjacent portion 30A of the member 20 adjacent the device body 14 is oriented parallel to the opening axis A and generally perpendicularly transverse to the loop plane and second distal portion 30B which defines the distal end 20A is oriented non-perpendicularly transverse to the loop plane and at an inclined angle to the opening axis A as if the button contact member 20 is extending away therefrom, such that the distal end 20A of the button contact member 20 is spaced further from the opening axis A than a proximal end of the distal portion 30B defined at the bend B. The device body 14, when mounted in the working position, is wholly oriented at an upward incline relative to the syringe body 2 such that the opening axis A is neither parallel to the top surface of the syringe body, above which top surfaces of the buttons 4, 5 are located, nor to the top surfaces of the buttons 4, 5. This allows the syringe body contact surface 22 to be suitably located forwardly of the buttons 4, 5, that is at a location between the buttons 4, 5 and the syringe discharge end 7, so that the syringe body contact surface 22 and the button contact surface 24 are maximally spaced from one another relative to the axial direction of the device body 14 and in the fore-aft direction of the syringe body 2 while still providing adequate contact with the button 4 to depress same. As such, in the illustrated embodiment, substantially all of an underside of the distal portion 30B of the button contact member 20 is in contact with the top surface of the button 4.

In use, the button hold-down device 10 is passed over the head of the syringe body 2 so as to bring the syringe body contact surface 22 of the bracing portion 16 in contact with the underside of the head just behind the syringe discharge 7 where the replaceable syringe tip is attachable. When the syringe body contact surface 22 is rested against the syringe body 2, the button contact member 20 is disposed against the button 4 due to the position of the device body 14 relative the syringe body 2 when mounted thereon and the orientation of the button contact member 20 projecting from the body 14. Locating the button 4 beneath and in contact with the button contact surface 24 on the underside of the member 20 acts to deflect the distal end of the member 20 generally radially outwardly to the axis A, but the member 20 is resiliently biased for example due to the hold-down portion 18 or due to the material of the member 20, which acts to maintain the button 4 in a depressed condition.

Nevertheless, with the button contact member 20 located for engagement, the hooked portion 25 is positionable in hooking action behind the button 4 to help retain the device 10 on the syringe against displacement of the device 10 in the forward axial direction.

As such, simply locating the hold-down device in the working position is enough to cause the device 10 to hold-down the button 4 for continuously and uninterruptedly discharging fluid from the syringe 1. When it is no longer desired to discharge fluid, the device 10 is simply removed from the syringe 1.

Figure 5:
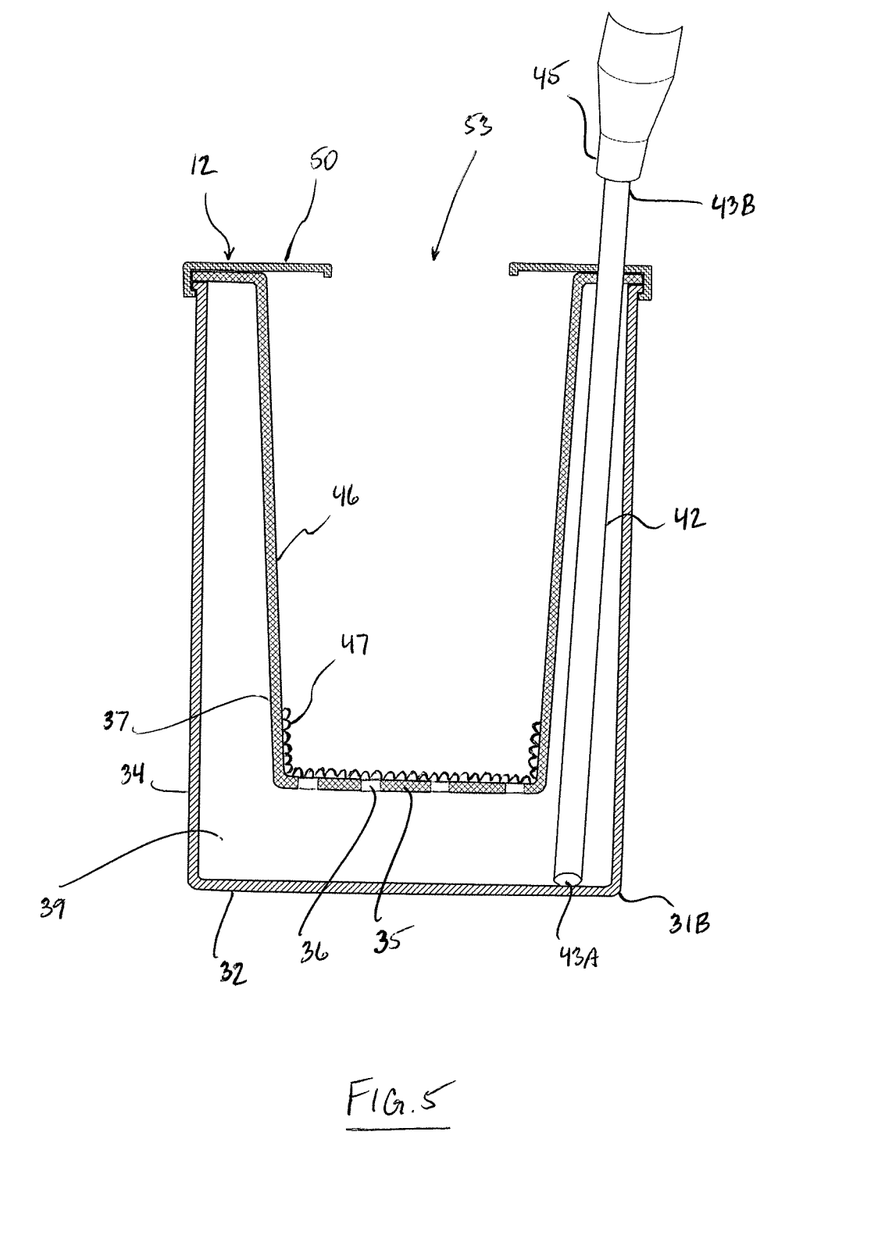
FIG. 5 is a cross-sectional view of an arrangement of container for collecting fluid during a purging operation according to the present invention.
Figure 6:
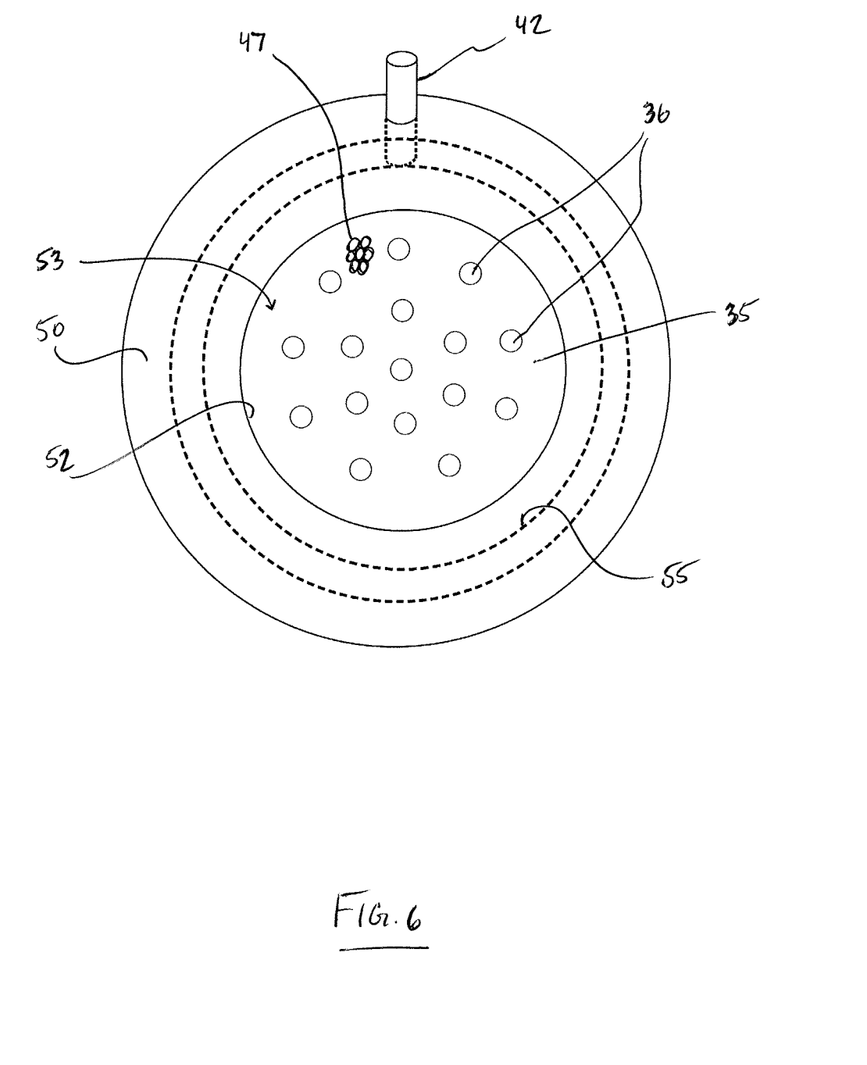
FIG. 6 is a top plan view of the arrangement of container of FIG. 5 where some components are omitted for clarity of illustration.

In conjunction with use of the hold-down device 10 in the purging operation, the collection container 12 of FIGS. 5 and 6 is usable to collect the discharged fluid emitted from the syringe 1. The collection container 12 comprises a container body 31 including an imperforate bottom wall 32 and an upstanding peripheral wall 34 which collectively define a receptacle. Within the receptacle is supported at a spaced height above the imperforate bottom wall 32 a perforated false bottom wall 35 locating a plurality of openings 36 at spaced locations thereon. In the illustrated embodiment, the perforated false bottom wall 35 is carried at the spaced location above the imperforate outer bottom wall 32 by an inner upright circumferential wall 37 depending from a top of the outer peripheral wall 34 where the inner wall 37 is connected thereto. However, in other embodiments, there may be no inner circumferential wall 37 and the perforated false bottom wall 35 can be connected and carried by the outer peripheral wall 34.

Thus, in the space beneath the perforated false bottom wall 35 and above the imperforate outer bottom wall 32 is formed a collection space 39 for collecting purged fluid discharged by the dental syringe 1. Typically, the dental syringe 1 with hold-down device 10 installed thereon in the working position is rested in the receptacle, with the syringe body 2 located in contact with the imperforate wall 35. Fluid is emitted from the syringe 1 and flows by gravity through the openings 36 defined in this false-bottom wall 35 to the collection space 39.

A drain in the form of an upstanding linearly extending tubular conduit 42 (schematically shown) is communicated with the fluid collection space 39 for removing the purged fluid from the container body 31. A lower open end 43A of the conduit 42 is disposed in the collection space 39 and an upper open end 43B is located externally of the container body 31 at a height spaced above the lower end 43A and is connectable to a suction unit in the form of a conventional dental saliva extractor 45 (schematically shown), so that the purged fluid is removed from the container 12 by suction. The conventional saliva extractor has a suction tube connected to the drain 42, and a pump operatively coupled to the suction tube to generate a partial vacuum for effecting the suction therethough. In the illustrated embodiment, an internal portion of the drain tube 42 which is located within a volumetric periphery of the container body 31 is substantially located in the space between the peripheral wall 34 and the inner circumferential wall 37.

The draining of the purged fluid from an elevation above the false-bottom wall 35 to the collection space 39 acts to remove purged fluid from a location in the container body 31 where it can interact with freshly discharged fluid to backsplash or to create a splashing effect, whereby purged fluid can be inadvertently expelled from the container body 12. Furthermore, an inner surface 46 of the container body 12 at the false-bottom wall 35 and the inner circumferential wall 45 is lined with a plurality of anti-splash projections 47 which project from the inner surface 46 and act to reduce backsplash of discharged fluid with the interior of the container body 31. In FIG. 5 only a portion of the inner surface 46 and that of the false-bottom wall 35 in FIG. 6 is shown as covered with the protrusions 47 for convenience and clarity of illustration.

It will be appreciated that in other arrangements which are not shown, the protrusions 47 may be replaced by a different anti-splash-back member(s) that is configured to cut the stream of fluid discharged from the syringe while still allowing purged fluid to pass through it. For example, the anti-splash-back member(s) in such other arrangements may comprise pointed-tip projections or a mesh formed from intersecting members which have a non-flat surface facing inwardly towards the interior of the collection container 12.

To further reduce any backsplash, an annular splash guard 50 is mounted at a top of the container body 12 so as to be located at a height above the false bottom wall 35. The splash guard 50 encompasses the full circumference of the top of the container body and extends from the upstanding peripheral wall 34 to an annular inner edge 52 defining a central opening 53 through the syringe 1 can be passed to be subsequently left purging inside the container 12. As shown in FIG. 6, the annular inner edge 52 of the splash guard 50 is located inwardly of an interior perimeter 55 of the false bottom wall 35 so that it overlaps and covers a portion of the surface area of the false bottom wall 35 to inhibit any splashing fluid from exiting the container through the top.

In example use of the apparatus disclosed herein, in a purging operation, the syringe 1 with installed button hold-down device 10 is placed in the collection container 12 to which drain 42 is connected a saliva extractor 45 which is turned and left on for the duration of the purging operation. The button hold-down device 10 maintains the corresponding button(s) of the syringe 1 depressed so that discharging fluid is continuously and uninterruptedly emitted from the syringe into the container body 31. The discharged fluid drains to the collection space 39 where the suction of the operational saliva extractor via the drain tube 42 removes the already discharged fluid from the container body 31. Thus there is minimal opportunity for the fluid to overflow the container body 31 as the saliva extractor is continuously removing any fluid collected in the space 39. This apparatus can thus be left unattended for the prescribed duration over which the syringe is to be purged. In conventional dental syringe arrangements, a foot pedal thereof will have to be weighted down with a free weight so that the fluid is continuously delivered to the syringe 1 for subsequent discharge therefrom.

The scope of the claims should not be limited by the preferred embodiments set forth in the examples but should be given the broadest interpretation consistent with the specification as a whole.

The invention claimed is:

1. A dental syringe button hold-down system comprising:
  a dental syringe having a syringe body adapted for supporting a syringe tip and at least one button carried on the syringe body for discharging a fluid out of the syringe body; and
  a button hold-down device comprising:
    a device body defining an opening for receiving the syringe body therein in a working position of the device body, wherein the opening has an axis which is substantially normal to a plane defined by the device body;
    a syringe body contact surface on the device body at a location along a periphery of the opening and configured for engaging the syringe body of the dental syringe to support the button hold-down device in the working position; and
    a button contact surface supported by and at an axially spaced location from the device body relative to the axis of the opening and configured for engaging said at least one button of the dental syringe in the working position.

2. The dental syringe button hold-down system of claim 1 wherein the device body forms a closed annulus and wherein the button hold-down device further includes a button contact member connected to the device body and carrying the button contact surface, wherein the button contact member projects transversely from the device body relative to the plane defined by the device body.

3. The dental syringe button hold-down system of claim 2 wherein the button contact member is connected to the device body at a transversely central location and projects therefrom towards one side of the device body.

4. The dental syringe button hold-down system of claim 2 wherein a portion of the button contact member defining the button contact surface is oriented at an inclined angle to the axis of the opening.

5. The dental syringe button hold-down system of claim 1 wherein the button hold-down device includes a hooked portion coupled to the device body and configured for wrapping about said at least one button from the top surface thereof towards an underside of said at least one button, wherein the hooked portion comprises a neck portion projecting in a generally radially inward direction relative to the opening defined by the device body and an end portion which projects from the neck portion to a terminus spaced axially of the neck portion to form a hooked end.

6. The dental syringe button hold-down system of claim 5 wherein the end portion of the hooked portion is bifurcated to extend from a central location of said at least one button to either side of a respective stem of said at least one button.

7. The dental syringe button hold-down system of claim 4 wherein the portion of the button contact member defining the button contact surface is inclined away from the axis of the opening such that a distal end of the button contact member with respect to the device body is spaced further from the axis than a proximal end of the button contact member.

8. A button hold-down device configured for use with a dental syringe having a syringe body adapted for supporting a syringe tip and at least one button carried on the syringe body for discharging a fluid out of the syringe body, the button hold-down device comprising:
a device body defining an opening for receiving the syringe body therein in a working position of the device body, wherein the opening has an axis which is substantially normal to a plane defined by the device body, wherein the device body forms a closed annulus;
a syringe body contact surface supported on the device body at a location along a periphery of the opening for engaging the syringe body of the dental syringe to support the button hold-down device in the working position;
a button contact member connected to the device body and projecting transversely from the device body relative to the plane defined by the device body; and
a button contact surface supported on the button contact member at an axially spaced location from the device body relative to the axis of the opening and configured for engaging said at least one button of the dental syringe in the working position;
wherein a portion of the button contact member defining the button contact surface is oriented at an inclined angle to the axis of the opening.

9. The button hold-down device of claim 8 further including a hooked portion coupled to the device body and configured for wrapping about said at least one button from the top surface thereof towards an underside of said at least one button, wherein the hooked portion comprises a neck portion projecting in a generally radially inward direction relative to the opening defined by the device body and an end portion which projects from the neck portion to a terminus spaced axially of the neck portion to form a hooked end.

10. The button hold-down device of claim 9 wherein the end portion of the hooked portion is bifurcated to extend from a central location of said at least one button to either side of a respective stem of said at least one button.

* * * * *